US008391036B2

(12) United States Patent
Clemo et al.

(10) Patent No.: US 8,391,036 B2
(45) Date of Patent: Mar. 5, 2013

(54) SELECTIVE ENABLEMENT OF POWER SUPPLY SECTIONS FOR IMPROVING EFFICIENCY

(75) Inventors: Raymond M. Clemo, Raleigh, NC (US); Michael J. Steinmetz, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 12/648,740

(22) Filed: Dec. 29, 2009

(65) Prior Publication Data

US 2011/0157934 A1 Jun. 30, 2011

(51) Int. Cl.
    H02M 7/08 (2006.01)
(52) U.S. Cl. .......................................................... 363/69
(58) Field of Classification Search .................. 363/65, 363/67, 69, 125–127
    See application file for complete search history.

(56) References Cited

U.S. PATENT DOCUMENTS

| 6,031,747 | A | 2/2000 | Ilic et al. | |
|---|---|---|---|---|
| 6,157,168 | A * | 12/2000 | Malik | 320/128 |
| 6,462,964 | B2 | 10/2002 | Porter et al. | |
| 7,633,782 | B1 * | 12/2009 | Herbert | 363/125 |
| 7,688,048 | B2 * | 3/2010 | Nielsen | 323/268 |
| 8,008,809 | B2 * | 8/2011 | Nielsen | 307/82 |
| 8,049,365 | B2 * | 11/2011 | Suzuki et al. | 307/64 |
| 2003/0081438 | A1 * | 5/2003 | Dinh et al. | 363/127 |
| 2008/0197706 | A1 * | 8/2008 | Nielsen | 307/66 |
| 2008/0224675 | A1 | 9/2008 | Takagi | |
| 2008/0298093 | A1 * | 12/2008 | Jin et al. | 363/21.06 |
| 2009/0027930 | A1 * | 1/2009 | Usui | 363/84 |
| 2009/0027931 | A1 * | 1/2009 | Usui | 363/84 |
| 2009/0129128 | A1 * | 5/2009 | Hirahara | 363/49 |
| 2009/0172453 | A1 | 7/2009 | Dishman et al. | |
| 2009/0174257 | A1 | 7/2009 | Li et al. | |
| 2009/0296432 | A1 * | 12/2009 | Chapuis | 363/65 |
| 2010/0054001 | A1 * | 3/2010 | Dyer et al. | 363/21.17 |
| 2011/0044077 | A1 * | 2/2011 | Nielsen | 363/37 |

OTHER PUBLICATIONS

Huth, Stefan "DC/DC-Converters in Parallel Operation with Digital Load Distribution Control", Sep. 1996, pp. 808-813.
"Hybrid DCDC Converter with Improved Conversion Efficiency and Output Regulation", IPCOM000008302D, Jun. 4, 2002, 5 pages.
IBM, "Method and Apparatus for Power Supply Minimum Load Management", IPCOM000141607D, Oct. 10, 2006, 4 pages.
IBM, "Changing Power Supply Loading to Maximinize Total System Power Supply Efficiency", IPCOM000168608D, Mar. 18, 2008, 3 pages.
IBM, "Voltage Converter Circuitry for Optimal Power Efficiency", IPCOM000181515D, Apr. 3, 2009, 3 pages.

* cited by examiner

*Primary Examiner* — Adolf Berhane
(74) *Attorney, Agent, or Firm* — Cynthia G. Seal; Jeffrey L. Streets (57) ABSTRACT

Systems and methods are disclosed for maximizing the efficiency of a power supply according to the value of a load to be powered. One embodiment provides a power supply system including a first and second stage. The first stage has at least one AC to DC conversion section for converting an AC input to DC at an upper DC voltage value. The second stage has at least one DC to DC regulation section for converting at least a portion of the DC at the upper DC voltage value to DC at a lower DC voltage value and supplying the lower DC voltage value to a DC output. One or both of the first and second stages includes more than one section operating in parallel. A controller selectively enables a selected combination of the AC to DC conversion sections and the DC to DC regulation sections according to an expected or actual value of the load.

20 Claims, 6 Drawing Sheets

SELECTIVE ENABLEMENT OF POWER SUPPLY SECTIONS FOR IMPROVING EFFICIENCY

BACKGROUND

1. Field of the Invention

The present invention relates to power supplies for computer systems, and more specifically to improving power efficiency for different sized loads.

2. Background of the Related Art

A computer system is powered by an electrical power supply that converts electricity from an electrical power source, such as an AC (alternating current) power outlet, to a form usable by a computer system and its various components. For example, a power supply may convert AC to DC (direct current) to supply electrical power at one or more desired DC amperage and voltage. One or more redundant power supplies are sometimes included to provide a backup in the event of a failure of a primary power supply.

The power requirements of computer systems vary widely among the multitude of different computer systems available in the marketplace. For example, the power requirement of a computer system may depend in part on the type of computer system, such as a desktop computer, portable computer, server, or rack-mount system. The power requirement of a computer system may also depend on the particular model or series of the computer system. Even within a particular series or model of computer system, the power requirement of a computer system may further depend on the specific hardware configuration or choice of software applications chosen by an end user. The type, series or model, and the individual hardware/software configuration of a computer system may determine power-related parameters of a computer system, such as the idle power, nominal power, maximum power, and the amount of time spent in a particular power or load range.

The efficiency of a power supply is a significant factor in the cost and environmental impact of operating a computer system. Furthermore, the efficiency of a power supply will typically vary according to the load on the power supply. A particular power supply may be designed and built, however, to be most efficient when operating in a target power range. Although the efficiency of a power supply is always less than 100%, a power supply may have a very good efficiency, such as on the order of 90% or better, when operated under the load or range of loads for which the power supply is optimized.

BRIEF SUMMARY

One embodiment of the present invention provides a power supply system for powering a load. A first stage includes at least one AC to DC conversion section configured for converting AC from an AC input to DC at an upper DC voltage value. A second stage in electronic communication with the first stage includes at least one DC to DC regulation section. Each DC to DC regulation section is configured for regulating at least a portion of the DC at the upper DC voltage value to DC at a lower DC voltage value and supplying the lower DC voltage value to a DC output. One or both of the first and second stage includes multiple sections. Thus, at least, the first stage includes more than one AC to DC conversion section or the second stage includes more than one DC to DC regulation section. A controller is provided for selectively enabling a selected combination of the at least one AC to DC conversion section and the at least one DC to DC regulation section according to a value of the load.

Another embodiment of the invention provides a method of powering a load. A nominal load value is obtained for a device to be coupled to a power supply output. An efficiency curve is obtained for each of a plurality of available power supply sections installed within the power supply. A combination of the available power supply sections having sufficient collective power capacity to meet the nominal load value is selected. The selected power supply sections are operated in parallel to convert a portion of an AC input to a DC output.

DETAILED DESCRIPTION

Embodiments of the invention include a power supply and method for which the power efficiency may be improved for any of a variety of loads. Thus, a single power supply according to an embodiment of the invention may be used to power any of a wide variety of computer systems under a wide variety of conditions. By having a single power supply wherein the power efficiency is improved for different loads, the number of power supply part numbers may now be reduced.

According to one embodiment, a power supply will include an AC-DC conversion stage for converting an AC input to a bulk DC output having an upper DC output voltage, and a DC-DC regulation stage for regulating the bulk DC down to a lower DC output voltage. In general, at least one of the stages must have at least two sections, each section being capable of handling at least a portion of the power supply's total output. These multiple sections will be selectively enabled according to the magnitude or expected magnitude of the load so that the combination of sections provides improved power efficiency for a given load.

More particularly, each section in a particular stage of the power supply may have a different power rating and a different efficiency curve, so that the nominal power output and power efficiency depend on which one or more of the sections are enabled. Each section in a stage having multiple sections will be selectively enabled and disabled according to the power requirements of the load. In some embodiments, a predetermined (static) selection of the multiple sections in a given stage is maintained in an enabled or disabled condition based on the nominal load coupled to the output of the power supply. In other embodiments, the individual sections in a given stage may be dynamically enabled and disabled according to the real-time load on the power supply. A variety of example systems and methods are also disclosed for selectively enabling and disabling the various sections in a given stage.

Figure 1:
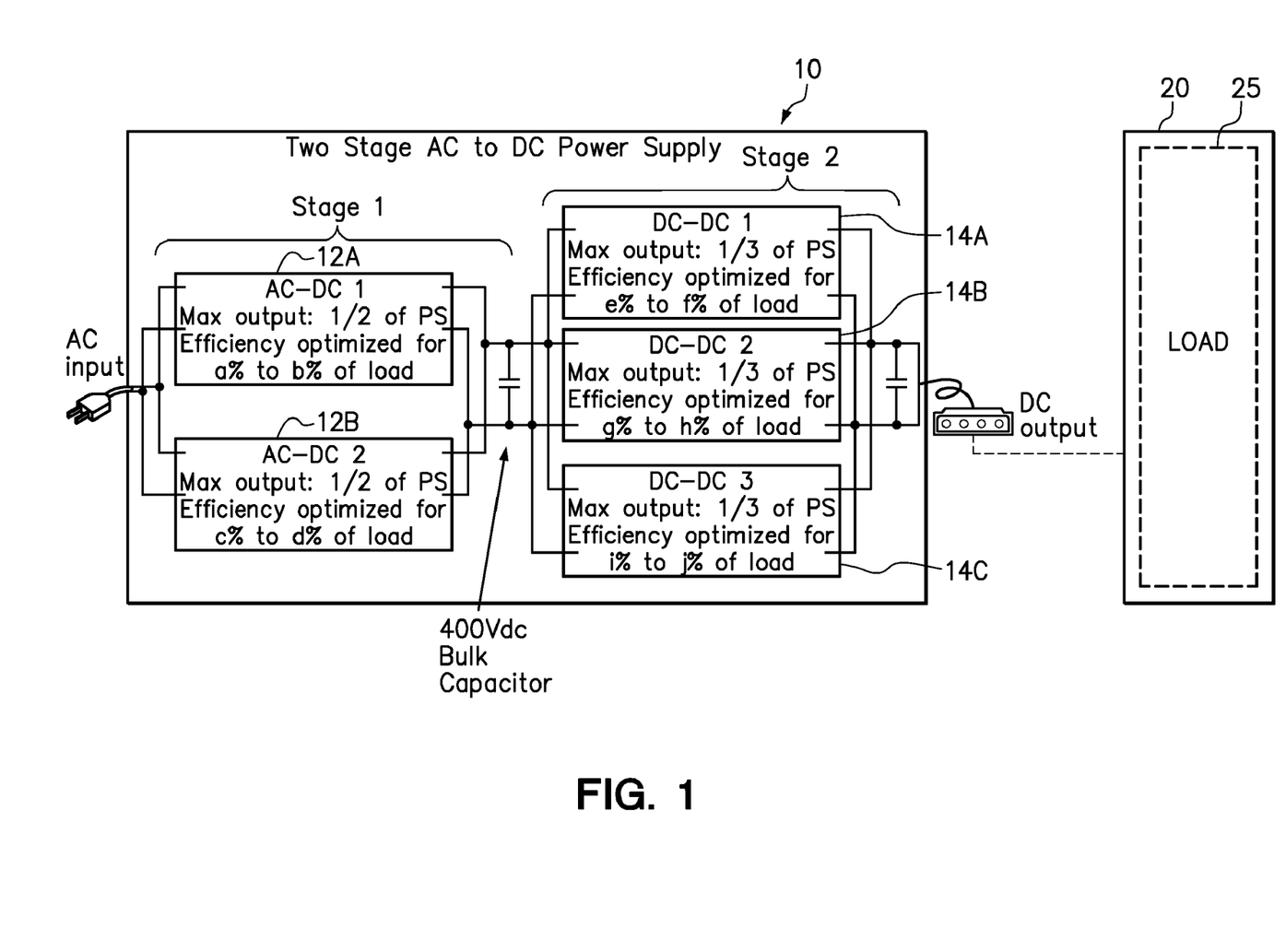
FIG. 1 is a block diagram of a two-stage AC to DC power supply according to an example embodiment of the invention, having a DC output and efficiency that may adjusted for different values of a load.

FIG. 1 is a block diagram of a two-stage AC to DC ("AC-DC") power supply 10 according to an example embodiment of the invention. The power supply 10 may be used to power a computer 20, which presents a load 25 to the power supply 10. Generally, multiple sections will be included within at least one stage of a power supply according to an embodiment of the invention. In the embodiment of FIG. 1, a first stage ("Stage 1") includes two AC-DC sections 12A, 12B, although generally, any number of AC-DC sections may be included. Each AC-DC section 12A, 12B, when enabled, is capable of providing power factor correction and converting at least a portion of an AC input voltage to a bulk DC voltage, typically at about 400V. The multiple AC-DC sections 12A, 12B are coupled in parallel, so that when both sections are in operation each AC-DC section 12A, 12B converts a portion of the AC input voltage to a portion of the bulk DC voltage. A second stage ("Stage 2") includes three DC-DC sections 14A, 14B, 14C, although generally, any number of DC-DC sections may be included. Each DC-DC section 14A, 14B, 14C, when enabled, is capable of regulating the higher, bulk DC voltage provided by the AC-DC sections 12A, 12B to a lower DC output voltage for powering the load 25. The multiple DC-DC sections 14A, 14B, 14C of Stage 2 are coupled in parallel, so that when the multiple sections are in operation each of the operating sections regulates a portion of the bulk DC voltage output by Stage 1 to a portion of the DC output voltage. The power output of the power supply 10 may be adjusted and/or the efficiency of the power supply 10 may be adjusted or maximized by enabling a selected combination of the AC-DC sections 12A, 12B and a selected combination of DC-DC sections 14A, 14B, 14C according to the load 25. For example, the combination of sections to enable may be selected according to the maximum or nominal power required to operate the computer 20 or according to a time-varying magnitude of the power actually consumed by the computer 20 while in operation.

Each AC-DC section 12A, 12B and each DC-DC section 14A, 14B, 14C has a power capacity that is less than the maximum power output of the power supply 10, allowing each section to participate in processing up to some fraction of the maximum power output of the power supply 10. In the example shown in FIG. 1, each AC-DC section 12A, 12B has the same power capacity and each DC-DC section 14A, 14B, 14C has the same power capacity, but in another embodiment, the different sections of a stage may have different power capacities. More particularly, in Stage 1, sections 12A, 12B each have a power capacity that is one-half of the maximum power output of the power supply 10, meaning that each section 12A, 12B is capable of performing power factor correction and converting AC to bulk DC for an amount of power equal to one half of the maximum power output of the power supply 10. In Stage 2, sections 14A, 14B, 14C each have a power capacity that is one-third of the maximum power output of the power supply 10, meaning that each section 14A, 14B, 14C is capable of converting the bulk DC to a lower DC output voltage for an amount of power equal to one third of the maximum power output of the power supply 10. In accordance with the present example, if the power capacity of the power supply 10 were 1000 W, then AC-DC sections 12A, 12B would each have a power capacity of 500 W, and DC-DC sections 14A, 14B, 14C would each have a power capacity of about 333 W. The power capacity of the power supply 10 may therefore be controlled according to which sections of each stage are enabled.

The AC-DC sections 12A, 12B in Stage 1 and DC-DC sections 14A, 14B, 14C in Stage 2 each have an efficiency that varies with the amount of power being processed by the particular section. In Stage 1 of this example, the efficiency of a first AC-DC section 12A is optimized over a range of from a % to b % of the power capacity of that section 12A, and the efficiency of a second AC-DC section 12B is optimized over a range of from c % to d % of the power capacity of that section 12B. These two ranges a % to b % and c % to d % may overlap, but no overlap is required. Similarly, in Stage 2 of this example, the efficiency of a first DC-DC section 14A is optimized over a range of from e % to f % of the power capacity of that section 14A, the efficiency of a second DC-DC section 14B is optimized over a range of from g % to h % of the power capacity of that section 14B, and the efficiency of a third DC-DC section 14C is optimized over a range of from i % to j % of the power capacity of that section 12C. These ranges also may overlap, but no overlap is required.

Figure 2:
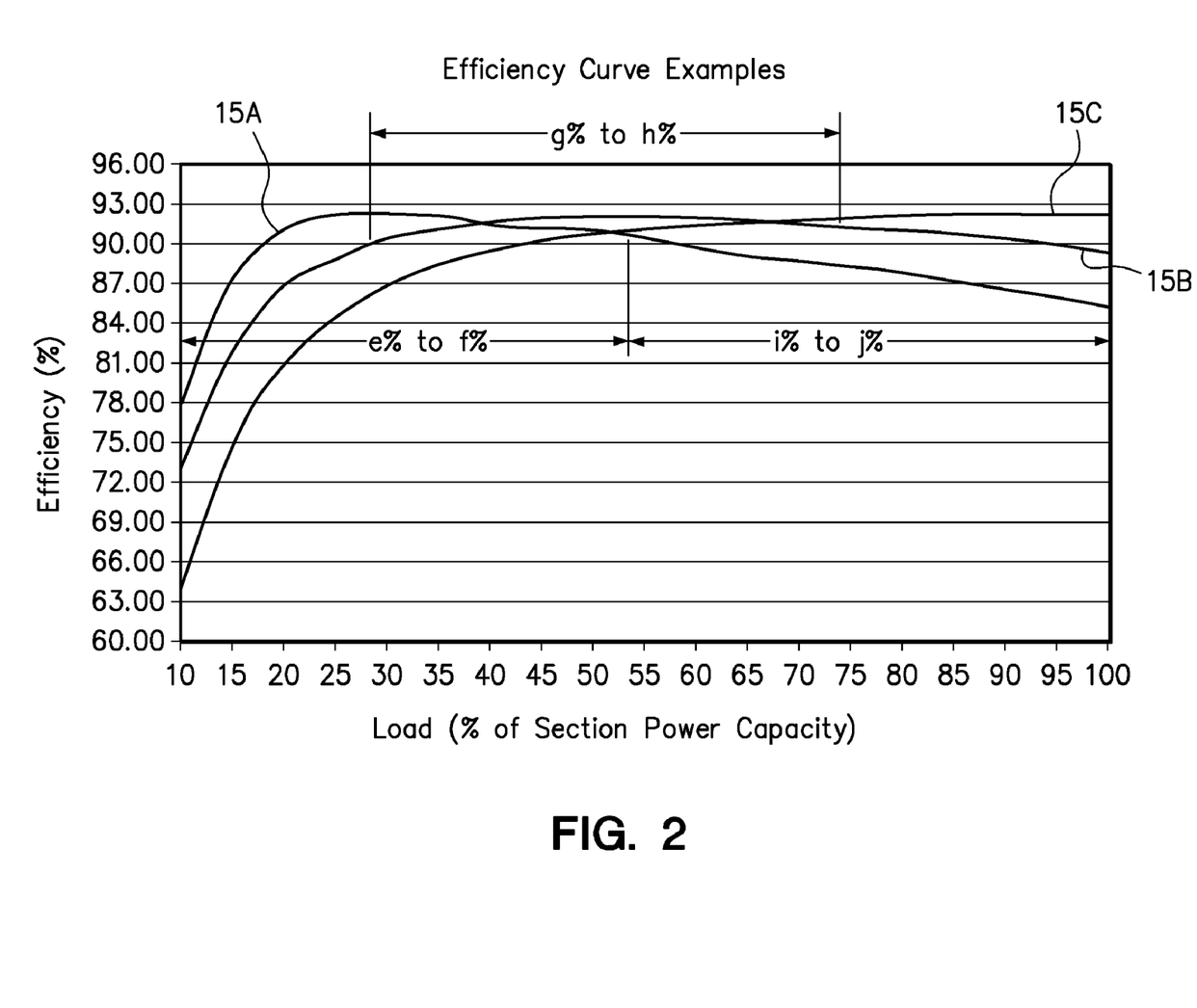
FIG. 2 is a graph including three efficiency curves illustrating how the efficiency of different power supply sections may vary as a function of the percent of maximum load.

FIG. 2 is a plot of three efficiency curves 15A, 15B, 15C illustrating how the efficiency of the three Stage 2 sections 14A, 14B, 14C of FIG. 1 may vary with amount of power processed by each section. Each section 14A, 14B, 14C has the greatest efficiency over a different range of the section's total power capacity. A first curve 15A represents the efficiency of the first DC-DC section 14A, which has greatest efficiency from e % to f % of that section's power capacity. A second curve 15B represents the efficiency of the second DC-DC section 14B, which has greatest efficiency from g % to h % of that section's power capacity. A third curve 15C represents the efficiency of the third DC-DC section 14C, which has an efficiency that is greatest from i % to j % of that section's power capacity. The first DC-DC section 14A may be referred to as "low-end optimized" because it has greatest efficiency over a low range of power capacity in comparison to the other two sections. The third DC-DC section 14C may be referred to as "high-end optimized" because it has greatest efficiency over a high range of power capacity in comparison to the other two sections. Because each section 14A, 14B, 14C has a different efficiency curve, the efficiency of the power supply 10 as a unit depends on which of the sections are enabled and the load handled by the enable sections.

Thus, according to one power management aspect, the AC-DC sections 12A, 12B of Stage 1 and the DC-DC sections 14A, 14B, 14C of Stage 2 may be selectively enabled to provide a combined power output that is sufficient to supply the power requirements of the load 25. According to another power management aspect, a particular combination of the AC-DC sections 12A, 12B of Stage 1 and a particular combination of the DC-DC sections 14A, 14B, 14C of Stage 2 may be enabled to obtain the greatest efficiency of any available combination of those sections given a particular magnitude or range of magnitude of the load 25. A predetermined, static selection of the various sections may be enabled to provide sufficient power output and the best obtainable efficiency for the maximum power required to operate the computer 20. Alternatively, the real-time value of the load 25 may be monitored, and the various sections may be dynamically enabled and disabled to provide sufficient power and the best obtainable efficiency for the time varying magnitude of the load 25.

Figure 3:
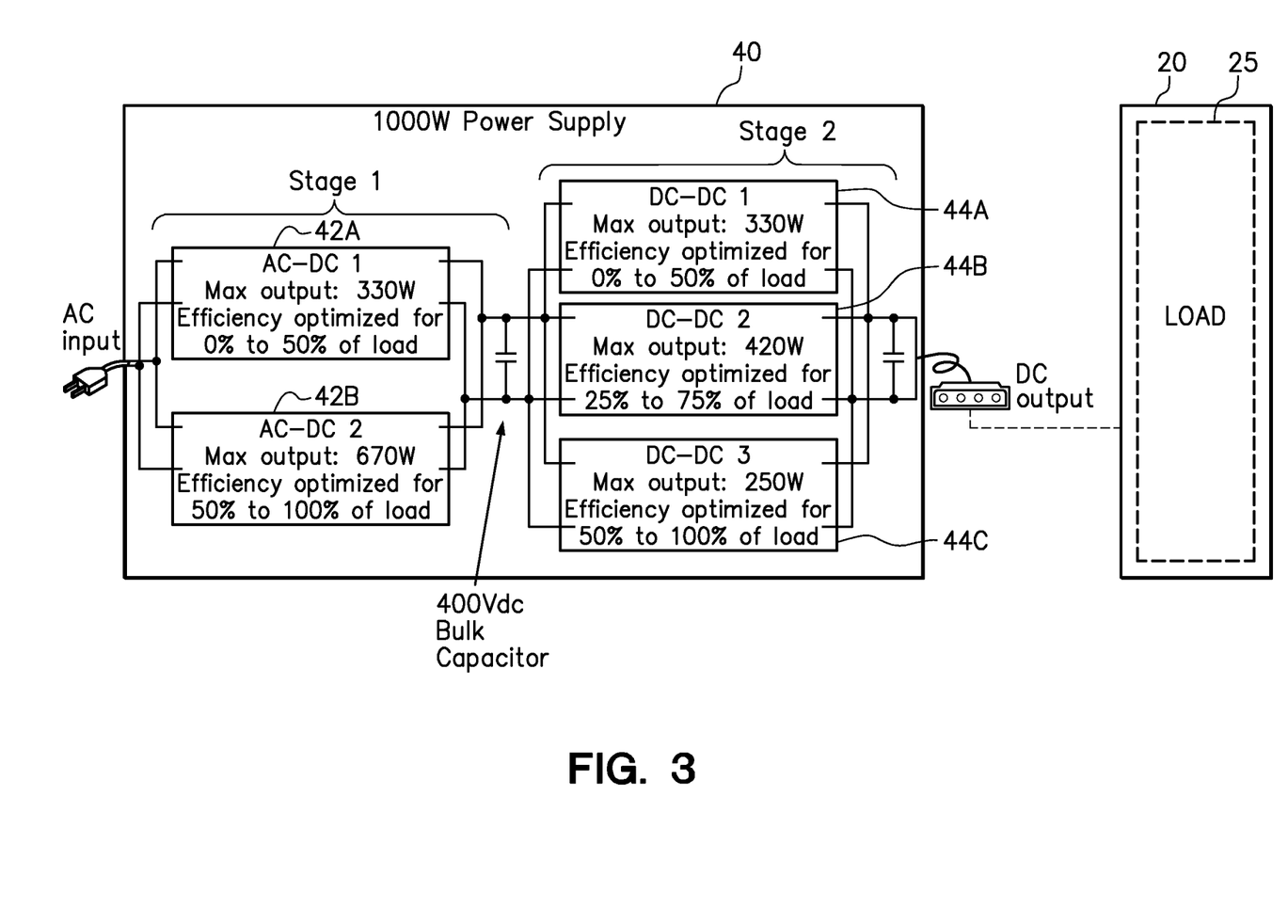
FIG. 3 is a block diagram of the two-stage power supply of FIG. 1, wherein specific, numerical power ranges have been supplied by way of example.

FIG. 3 is a block diagram of the two-stage power supply 40, wherein specific efficiencies and power capacities have been listed by way of example. In this example, the first AC-DC section 42A of Stage 1 provides a power capacity of 330 W and is efficiency-optimized for a range of between 0% and 50% of its power capacity (i.e. 0 W to 165 W). The second AC-DC section 42B of Stage 1 provides a power capacity of 670 W and is efficiency-optimized for a range of between 50% and 100% of its power capacity (i.e. 335 W to 670 W). The first DC-DC section 44A of Stage 2 provides a power capacity of 330 W and is efficiency-optimized for a range of between 0% and 50% of its power capacity (i.e. 0 W to 165 W). The second DC-DC section 44B of Stage 2 provides a power capacity of 420 W and is efficiency-optimized for range of between 25% and 75% of its power capacity (i.e. 105 W to 315 W). The third DC-DC section 44C of Stage 2 provides a power capacity of 250 W and is efficiency-optimized for a range of between 50% and 100% of its power capacity (i.e. 125 W to 250 W).

With its variety of selectable Stage 1 and Stage 2 sections, the single power supply 40 of FIG. 3 may be configured to supply power to any of a variety of values (e.g. maximum/nominal value or actual/time-varying value) of the load 25. Thus, the power supply 40 may be used to power a variety of different computer systems by selectively enabling an appropriate combination of the AC-DC sections 42A, 42B of Stage 1 and the DC-DC sections 44A, 44B, 44C of Stage 2. The same power supply 40 may be used to power to any of a 330 W computer system, a 750 W computer system, or a 1000 W computer system, by enabling an appropriate combination of sections 42A, 42B and 44A, 44B, 44C. For example, a computer system requiring a maximum of 330 W can be powered by enabling only the first AC-DC section 42A of Stage 1 and the first DC-DC section 44A of Stage 2, while the rest of the sections (42B of Stage 1 and 44B and 44C of Stage 2) are disabled. To power a computer system having a nominal load of 750 W, both the first and second AC-DC sections 42A, 42B of Stage 1 and the first and second DC-DC sections 44A, 44B of Stage 2 may be enabled, while the third section 44C of Stage 2 is disabled. To power a computer system requiring 1000 W of maximum power, all sections in both stages might be enabled.

The load 25 may be apportioned among the two sections of Stage 1 and the three sections of Stage 2 in a variety of ways, for changing values of the load. In one embodiment, the load 25 may be evenly apportioned among the combination of sections selected to power the load 25. For example, at a particular instant when the value of the load is 150 W, each section 44A, 44B, 44C may contribute 50 W each. Alternatively, any one of the Stage 2 sections capable of supplying 150 W may supply all 150 W. The power supplied by the various sections may alternatively be independently adjusted to operate within a desired region of the respective efficiency curve of each power supply, while the combination of sections provide an amount of power that totals the value of the load 25.

Figure 4:
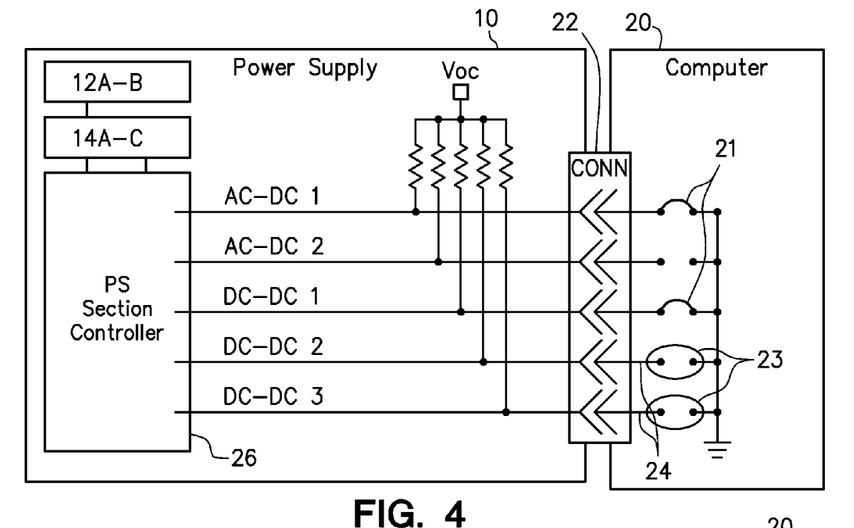
FIG. 4 is a block diagram of an embodiment of the invention wherein a computer is pre-wired to dictate a particular (static) combination of sections of the power supply to be enabled.

FIG. 4 is a block diagram of a system embodiment wherein a computer 20 is pre-wired to dictate a particular (static) combination of sections of the power supply 10 to be enabled for powering the computer 20. The desired combination of power supply sections may be predetermined according to the expected operating range of the load 25. For example, a combination of power supply sections may be selected that is capable of providing up to the maximum power required by the computer 20. Selecting and enabling a static combination of power supply sections may provide lower development costs by eliminating, or reducing, decision making software and hardware. The power supply 10 is connected to the computer 20 using a communication bus 22. Five signal lines 24 are provided from the computer 20 to the power supply 10, one for each section 12A, 12B, 14A, 14B, 14C, to provide section-enabling signals over the communication bus 22. Each signal line 24 has a break or bypass portion 23 to place the signal line in an open-circuit condition, and that may be individually closed by jumpers 21 to control which sections receive section-enabling signals. The manufacturer of the computer 20 may provide the jumpers 21 corresponding to a predetermined selection of the sections to be enabled when the power supply 10 is connected to the computer 20. The manufacturer may do so, for example, based on configuration information for the computer 20. Assuming the signals are active low, the example in FIG. 4 shows one AC-DC section 12A and one DC-DC section 14A are to be enabled. A power supply section controller 26 receives or senses the signals from the signal lines 24 having the jumpers 21 (i.e. the jumpered signal lines) and enables the selected sections. An alternative to providing jumpered signal lines would be to communicate which sections are to be on and off over a serial bus (not shown), such as an SMBus.

Figure 5:
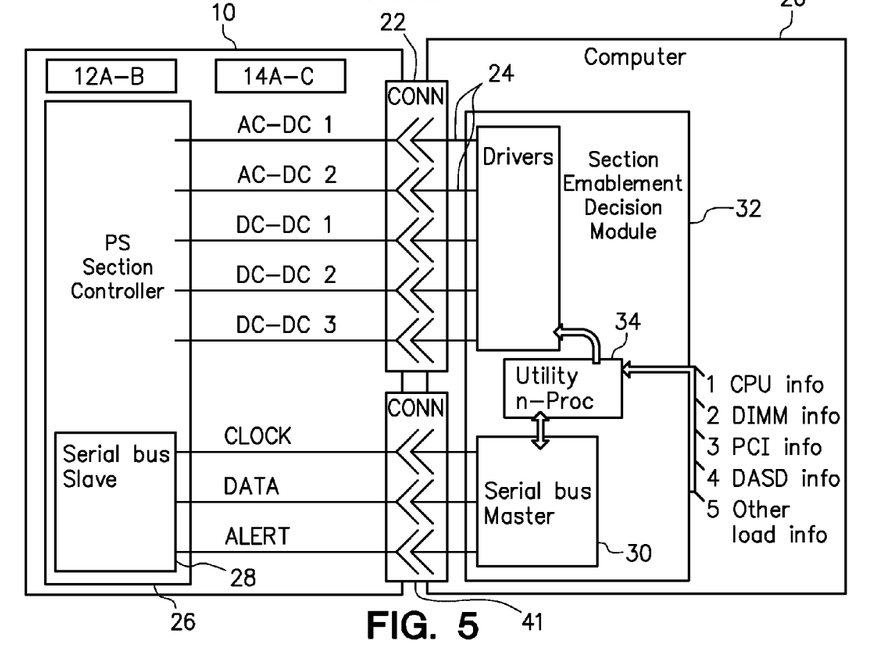
FIG. 5 is a block diagram of another system embodiment wherein power supply sections may be selectively enabled according to load profile information.

FIG. 5 is a block diagram of another system embodiment wherein power supply sections may be selectively enabled according to load profile information. The computer 20 to be powered includes a Section Enablement Decision Module 32. The Section Enablement Decision Module 32 may include combinations of hardware and software elements, configured to gather load profile information for various components of the computer 20 and determine which sections of the power supply 10 are to be enabled based on the load profile information. The load profile information may include, for example, power specifications for a central processing unit (CPU), memory such as DIMMs (dual in-line memory modules), PCI (peripheral component interface) components, DASDs (Direct Access Storage Devices), and other load information.

Modern computer systems and methods for gathering power information for components are generally known in the art, apart from their application to the present invention. The load profile information may be gathered and compiled, for example, by a u-Processor or micro-controller ("Utility u-Proc") 34, or other power-gathering means included with the section enablement decision module 32. In one example embodiment, the computer 20 may be a server including the u-Processor 34. The u-Processor 34 may, upon powering on the server, control power-on sequencing checks to identify the hardware features of the server, determine the power consumed by those hardware features, and run diagnostics on those hardware features. Additionally, during routine operation, the u-Processor 34 may monitor the server's health and perform other housekeeping tasks. The u-Processor 34 may also help provide an orderly shutdown when powering off the server.

In the embodiment of FIG. 5, the computer 20 controls the power supply sections. Signals indicating which power supply sections are to be enabled may be communicated to the power supply 10 via signal lines 24 included with the communications bus 22. Optionally, load information can be communicated from the computer 20, to the power supply 10, via a serial bus 41. A serial bus master (SBM) 30 provided with the computer 20 may, for example, communicate the load profile information to a serial bus slave (SBS) 28 included with or in communication with the power supply section controller 26. In this case, the power supply uses the load information from the computer 20 to control the power supply sections 12A-B, 14A-C. The sections to be enabled may be enabled by the power supply section controller 26.

Clock, Data, and Alert lines are illustrated in FIG. 5. Generally, a serial bus includes at least two, and sometimes three, signal lines. The most common serial buses used to communicate between power supplies and their servers are $I^2C$ and SMBus. SMBus uses three lines, in which a clock signal line ("Clock") is used to synchronize the various components on the line, a data signal line ("Data") is used to transmit all the data, and an alert signal line is used to alert the master communications device that one of the components has information to pass on. As adapted for use in the embodiment of FIG. 5, either the communications bus 22 or the serial bus 41, but typically not both, are used to control the power supply sections 12A-B and 14A-C.

By gathering load profile information, sections in the power supply can be enabled in response to the addition, removal, or reconfiguration of components. For example, the computer 20 may dynamically generate signals for enabling or selecting a different subset of the various sections available in Stage 1 in response to changes in hardware installed in the computer. However, in the embodiment of FIG. 5, the enabling of the sections is not performed in response to power measurements.

Figure 6:
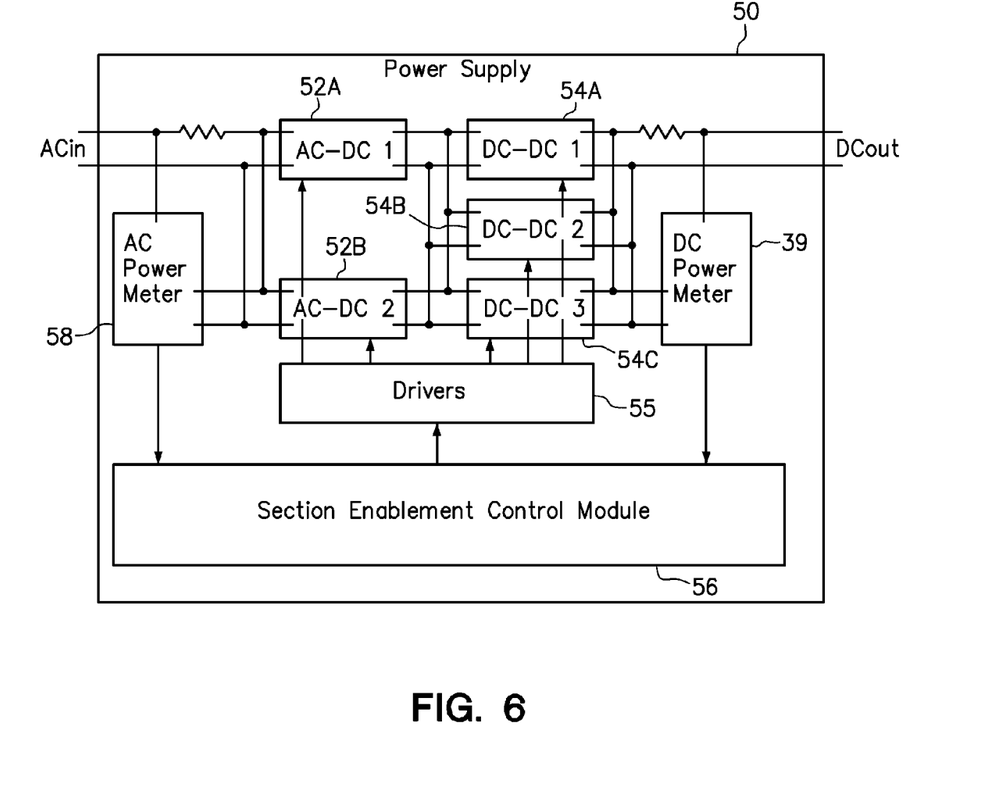
FIG. 6 is a block diagram of another system embodiment wherein the power supply sections to be enabled may be dynamically determined according to a changing load.

FIG. 6 is a block diagram of a power supply according to another embodiment of the invention having multiple power supply sections that may be dynamically enabled according to a changing load. The power supply 50 includes an AC power meter 58 and a DC power meter 59. The Section Enablement Decision module 56 and drivers 55 are optionally included with the power supply 50 in this embodiment. The Section Enablement Decision module 56 accepts real-time power consumption (load) values from the AC power meter 58 and DC power meter 59, optionally along with thermal information. The Section Enablement Decision module 56 then selectively and dynamically enables the power supply sections 52A, 52B, 54A, 54B, 54C, either based on an averaging approach using averaged power consumption values, or in real time in immediate response to instantaneous, real-time power consumption (load) values obtained by the computer.

It may be observed that, in the embodiment of FIG. 5, the expected value of the load is determined by the computer 20 based on load profile information obtained for installed hardware, without active load measurement. The Section Enablement Decision Module (32) may therefore reside either in the computer 20, when bus 22 is available for communicating the load to the power supply 10, or, in the power supply 10 itself, if the serial bus is available to the computer to relay load information to the power supply 10. The load profile information is static power-related information that does not account for variations due to software.

By comparison, in the embodiment of FIG. 6, the load may be measured in real time by the power supply 10, and so the power supply 10, itself, may include a Section Enablement Decision Module 56 for controlling section enablement. Because real time measurements are obtained in the FIG. 6 embodiment, the power supply 10 is able to adjust section enablement dynamically due to load variation from software, as well. In yet another embodiment, the real time load is obtained directly by the computer and either the computer or the power supply controls section enablement.

Figure 7:
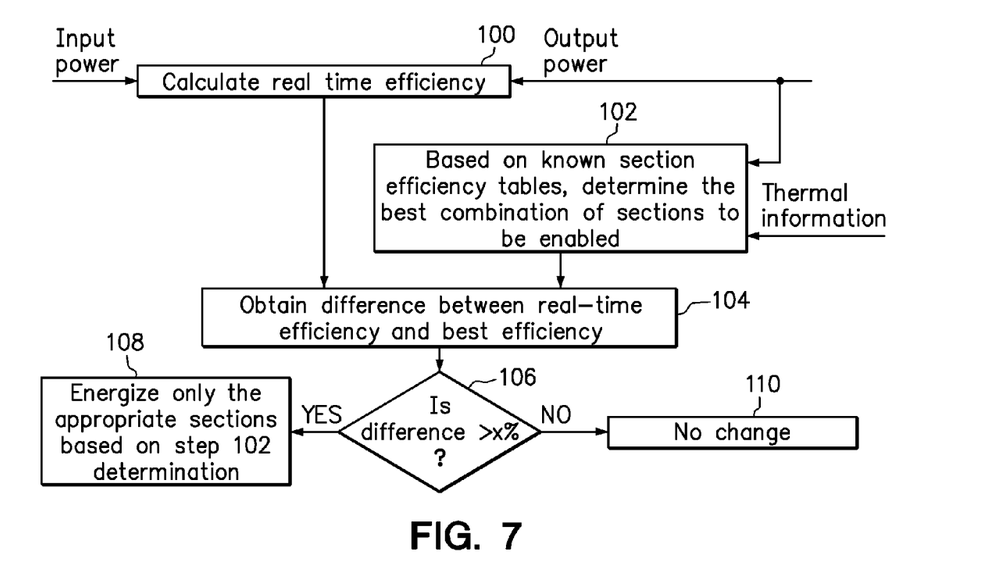
FIG. 7 is flowchart of a method for dynamically enabling power supply sections to improve efficiency.

FIG. 7 is a flowchart of a method that may be performed by the Section Enablement Decision module 56 of FIG. 6 for dynamically enabling power supply sections to improve efficiency. In step 100, the real-time efficiency of the power supply is calculated based on the input power and the output power, where the efficiency is the ratio of output power to input power. For example, if the input power were 500 W and the output power were 450 W at a particular instant in time, the real-time efficiency would be 450 W/500 W or 90%.

In step 102, the best combination of sections to be enabled may be determined based on the output power and, optionally, as informed by thermal information. For example, for a power supply stage having multiple sections, more than one possible combination of sections may be capable of supplying the output power. However, the combination of sections expected to provide the best efficiency for the present value of the output power may be determined based on the known efficiency curve (or table) for each section (see FIG. 2 for a general discussion of efficiency curves). The efficiency curves may be provided in the form of electronic lookup tables providing efficiency versus power information consistent with the efficiency curves. For a particular value of power to be provided by the power supply, the amount of power expected to be handled by each section may be determined for various possible section combinations. The amount of power handled by each section may be controlled so that each section operates in the optimal portion of its efficiency curve. The sum of each enabled section's power capacity may be higher than the maximum power output needed to power the load, so that each section can be operated in its optimal efficiency range while the combination of sections will still provide sufficient power output. The amount of power provided by each section is controlled by limiting the current each section contributes to the total load.

In step 104, the difference between the real-time efficiency computed in step 100 and the best obtainable efficiency determined in step 102 is computed. This difference is compared to a setpoint value of X % in conditional step 106. If the difference is greater than the setpoint value X %, then the new combination of sections determined in step 102 are enabled according to step 108. Otherwise, if the difference is less than the setpoint value X %, no change is made in the sections enabled according to step 110. The value of the setpoint X % may be selected so that changes to the currently enable sections are not made unless an expected improvement of at least X % is expected to be obtained.

Figure 8:
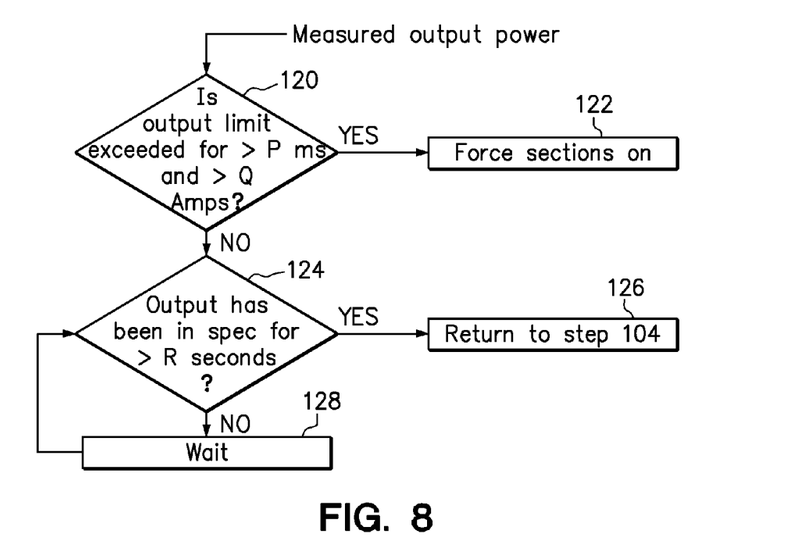
FIG. 8 is a flowchart of a method that may be used in combination with the method of FIG. 7 to ensure that the proper number of sections is turned on for dynamic loading events.

FIG. 8 is a flowchart of a method that may be used in combination with the method of FIG. 7 to ensure that the proper number of sections is turned on for dynamic loading events. Using the measured DC power output as a decision criterion, conditional step 120 queries whether a power output limit is exceeded for specified time and current setpoint values (in this case, P milliseconds and Q amperes, respectively). If so, this indicates the rated power of the currently enabled combination of sections is being exceeded by the actual load. Thus, additional sections are enabled (e.g. forced on) in step 122. Otherwise, conditional step 124 verifies whether the power output has been in a specified range for at least a setpoint time value, in this case for at least R seconds. If the power output has been in the specified range for at least R seconds, then step 126 leads to step 104 of the method of FIG. 7. If the power output has not been in the specified range for at least R seconds, then the system waits until at least R seconds have elapsed according to step 128, at which time it is determined whether the power output has been in the specified range for at least R seconds.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A power supply system for powering a load, comprising:
    a first stage including at least one alternating current (AC) to direct current (DC) conversion section configured for converting AC from an AC input to DC at an upper DC voltage value;
    a second stage in electronic communication with the first stage, the second stage including at least one DC to DC regulation section, wherein each DC to DC regulation section is configured for regulating at least a portion of the DC at the upper DC voltage value to DC at a lower DC voltage value and supplying the lower DC voltage value to a DC output;
    wherein the first stage includes more than one AC to DC conversion section or the second stage includes more than one DC to DC regulation section; and
    a controller for selectively enabling a selected combination of the at least one AC to DC conversion section and the at least one DC to DC regulation section according to a value of the load.

2. The power supply system of claim 1, wherein the first stage includes more than one AC to DC conversion section, each having a different efficiency curve.

3. The power supply system of claim 2, wherein the controller is configured to select a combination of the AC to DC conversion sections having the greatest efficiency of any available combination of the AC to DC conversion sections according to the value of the load.

4. The power supply system of claim 2, wherein the controller is configured to independently adjust the amount of power handled by each of the more than one AC to DC conversion sections to operate in a selected range of the respective efficiency curve.

5. The power supply system of claim 1, wherein the second stage includes more than one DC to DC regulation section, each DC to DC regulation section having a different efficiency curve.

6. The power supply system of claim 5, wherein the controller is configured to select the combination of the DC to DC regulation sections having the greatest efficiency of any available combination of the DC to DC regulation sections according to the value of the load.

7. The power supply system of claim 5, wherein the controller is configured to independently adjust the amount of power handled by each of the more than one DC to DC regulation sections to operate in a selected range of the respective efficiency curve.

8. The power supply system of claim 1, further comprising:
    a plurality of signal lines from the controller to the at least one AC to DC conversion section, each signal line include a break or bypass portion; and
    jumpers for closing the break or bypass portion of the signal lines associated with the selected combination of AC to DC and DC to DC regulation sections, while the signal lines associated with the other sections remain in an open-circuit condition.

9. The power supply system of claim 8, wherein the jumpers are provided in a computer providing the load, wherein the computer is external to a power supply housing the AC to DC conversion sections and the DC to DC regulation sections.

10. The power supply system of claim 1, further comprising:
    an AC power meter configured for measuring the AC input power provided to the at least one AC to DC conversion section; and
    wherein the controller includes logic for monitoring a real-time value of the load and dynamically controlling which of the plurality of DC to DC regulation sections is enabled as a function of the real-time value of the AC power consumed.

11. The power supply system of claim 10, further comprising:
    a DC power meter configured for measuring the DC power output from the at least one DC to DC regulation section; and
    wherein the controller includes logic for comparing real-time value of the DC power output to the real-time value of the AC input to determine an actual efficiency.

12. The power supply system of claim 11, wherein the controller includes logic for determining a difference between the actual efficiency and the expected efficiency of another combination of the at least one AC to DC conversion section and the at least one DC to DC regulation section, and enabling the another combination of the conversion and regulation sections in response to the difference exceeding a setpoint.

13. The power supply system of claim 1, wherein the logic for controlling which of the plurality of DC to DC regulation sections is in the active state includes logic for determining the most efficient selection of the plurality of DC to DC regulation sections to be active according to the actual load.

14. The power supply system of claim 1, wherein the controller is configured for automatically obtaining a load profile for components of a computer system to be powered and determining an expected value of the load based on the load profile.

15. The power supply system of claim 1, further comprising:
    one or both of a plurality of the DC to DC regulation sections each having a different power capacity and a plurality of the AC to DC conversion sections each having a different power capacity.

16. A method of powering a load, comprising:
    obtaining a nominal load value of a device to be coupled to a power supply output;
    obtaining an efficiency curve for each of a plurality of available power supply sections installed within the power supply;
    selecting a combination of the available power supply sections having sufficient collective power capacity to meet the nominal load value; and
    operating the selected power supply sections in parallel to convert a portion of an AC input to a DC output.

17. The method of claim 16, further comprising:
    monitoring a current value of the load; and
    dynamically selecting the most efficient combination of the power supply sections according to the current value of the load.

18. The method of claim 16, further comprising:
determining a load profile for a computer providing the load, wherein the load profile includes power specifications for components of the computer; and
selecting the most efficient combination of the power supply sections according to the load profile.

19. The method of claim 16, further comprising:
referencing an electronic lookup table providing efficiency as a function of power output for each power supply section; and
independently adjusting the amount of power handled by each power supply section to operate in a selected range of the respective efficiency versus power profile.

20. The method of claim 16, further comprising:
comparing real-time value of the DC output to the real-time value of the AC input to determine an actual efficiency; and
determining a difference between the actual efficiency and the expected efficiency of a selected combination of the power supply sections, and enabling the selected combination in response to the difference exceeding a setpoint.

* * * * *